United States Patent
Porter et al.

(10) Patent No.: US 6,745,624 B2
(45) Date of Patent: Jun. 8, 2004

(54) METHOD AND SYSTEM FOR CALIBRATING A TIRE PRESSURE SENSING SYSTEM FOR AN AUTOMOTIVE VEHICLE

(75) Inventors: Frederick James Porter, Farmington Hills, MI (US); John LeBeau Rust, Belleville, MI (US); John Tenbusch, Farmington Hills, MI (US); Thomas Michael McQuade, Ann Arbor, MI (US); Thomas Lee Miller, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,704

(22) Filed: Feb. 5, 2002

(65) Prior Publication Data

US 2003/0145645 A1 Aug. 7, 2003

(51) Int. Cl.[7] .......................... G01L 17/00; G01L 19/12
(52) U.S. Cl. ...................... 73/146.2; 73/146.4; 340/447
(58) Field of Search .................. 73/146.2, 146, 73/1.59, 146.4, 146.5; 702/98; 340/870.04, 870.07, 870.16, 445, 447, 448

(56) References Cited

U.S. PATENT DOCUMENTS

| | | | |
|---|---|---|---|
| 1,948,427 A | | 2/1934 | Moecker |
| 2,274,557 A | * | 2/1942 | Morgan et al. ........ 73/146.2 X |
| 2,578,358 A | | 12/1951 | Jellison |
| 2,589,623 A | | 3/1952 | Merritt et al. .............. 116/129 |
| 3,911,855 A | | 10/1975 | Haven .................... 116/114 W |
| 3,965,847 A | | 6/1976 | Deming ................. 116/114 W |
| 3,974,477 A | | 8/1976 | Hester .................. 200/61.25 X |
| 4,051,803 A | | 10/1977 | Arnone ...................... 116/34 R |
| 4,316,176 A | | 2/1982 | Gee et al. .............. 73/146.5 X |
| 4,376,931 A | | 3/1983 | Komatu et al. ...... 200/61.22 X |
| 4,494,106 A | * | 1/1985 | Smith et al. ........... 73/146.5 X |
| 4,510,484 A | | 4/1985 | Snyder .................. 73/146.5 X |
| 4,574,267 A | * | 3/1986 | Jones .................... 73/146.4 X |
| 4,742,476 A | | 5/1988 | Schwartz et al. |
| 5,061,917 A | | 10/1991 | Higgs et al. ................. 340/539 |
| 5,109,213 A | | 4/1992 | Williams .................... 340/447 |
| 5,463,374 A | | 10/1995 | Mendez et al. ............. 340/442 |
| 5,517,853 A | | 5/1996 | Chamussy ................. 73/146.3 |
| 5,583,482 A | | 12/1996 | Chamussy et al. .......... 340/442 |
| 5,600,301 A | | 2/1997 | Robinson, III .............. 340/442 |
| 5,612,671 A | | 3/1997 | Mendez et al. ............. 340/447 |
| 5,656,993 A | | 8/1997 | Coulthard .................... 340/442 |
| 5,661,651 A | | 8/1997 | Geschke et al. |
| 5,717,376 A | | 2/1998 | Wilson ........................ 340/442 |
| 5,721,528 A | | 2/1998 | Boesch et al. .............. 340/442 |
| 5,741,966 A | | 4/1998 | Handfield et al. ......... 73/146.5 |
| 5,801,306 A | | 9/1998 | Chamussy et al. ......... 73/146.2 |
| 5,838,229 A | | 11/1998 | Robinson, III .............. 340/442 |
| 5,853,020 A | | 12/1998 | Widner ........................ 137/227 |
| 5,913,240 A | | 6/1999 | Drähne et al. ................ 73/146 |
| 5,926,087 A | | 7/1999 | Busch et al. ................. 340/438 |
| 5,939,977 A | | 8/1999 | Monson ...................... 340/442 |
| 5,963,128 A | | 10/1999 | McClelland ................. 340/447 |
| 5,965,808 A | | 10/1999 | Normann et al. .......... 73/146.5 |
| 5,969,239 A | | 10/1999 | Tromeur et al. ........... 73/146.5 |

(List continued on next page.)

Primary Examiner—Thomas P. Noland
(74) Attorney, Agent, or Firm—Gregory P. Brown

(57) ABSTRACT

A system (10) and method is provided for calibrating a tire pressure monitoring system using an EM transmitter (14). The present invention includes a first pressure sensor coupled to a wheel of an automotive vehicle (12). The EM pressure transmitter (14) is coupled to the pressure sensor (32). The transmitter (14) has a serial number associated therewith. An EM calibration device has a transmitting range. The EM transmitter device has an actuator. When the actuator is activated, a calibration signal (34) is transmitted within the transmitting range. The calibration signal causes the EM pressure transmitter (32) to transmit a serial number. A controller (16) is EM coupled to the pressure transmitter. The controller (16) receives the serial number and associates the serial number with a tire location of the vehicle.

7 Claims, 5 Drawing Sheets

U.S. PATENT DOCUMENTS

| | | | |
|---|---|---|---|
| 5,999,091 A | 12/1999 | Wortham | 340/43.1 |
| 6,034,597 A | 3/2000 | Normann et al. | 340/447 |
| 6,043,738 A | 3/2000 | Stewart et al. | 340/447 |
| 6,046,672 A | 4/2000 | Pearman | 340/447 |
| 6,078,252 A | 6/2000 | Kulczycki et al. | 340/425.5 |
| 6,111,520 A * | 8/2000 | Allen et al. | 340/870.16 |
| 6,161,071 A | 12/2000 | Shuman et al. | 701/48 |
| 6,199,575 B1 | 3/2001 | Widner | 137/227 |
| 6,204,758 B1 | 3/2001 | Wacker et al. | 340/444 |
| 6,225,895 B1 | 5/2001 | Bigelow, Jr. | 340/442 |
| 6,232,875 B1 | 5/2001 | DeZorzi | 340/442 |
| 6,246,317 B1 | 6/2001 | Pickornik et al. | 340/447 |
| 6,259,361 B1 | 7/2001 | Robillard et al. | 340/447 |
| 6,271,748 B1 | 8/2001 | Derbyshire et al. | 340/442 |
| 6,275,231 B1 | 8/2001 | Obradovich | 345/349 |
| 6,278,379 B1 * | 8/2001 | Allen et al. | 340/870.16 |
| 6,292,096 B1 | 9/2001 | Munch et al. | 340/445 |
| 6,293,147 B1 * | 9/2001 | Parker et al. | 73/146.4 X |
| 6,327,570 B1 | 12/2001 | Stevens | 705/7 |
| 6,339,736 B1 | 1/2002 | Moskowitz et al. | 701/29 |
| 2001/0008083 A1 | 7/2001 | Brown | 73/146 |
| 2002/0008718 A1 | 1/2002 | Obradovich | 345/764 |

* cited by examiner

METHOD AND SYSTEM FOR CALIBRATING A TIRE PRESSURE SENSING SYSTEM FOR AN AUTOMOTIVE VEHICLE

BACKGROUND OF THE INVENTION

The present invention relates generally to a system for monitoring tire pressures in an automotive vehicle, and more particularly, to a calibration method and system for calibrating the tire pressure system upon assembly and upon the maintenance of the tires.

Various types of pressure sensing systems for monitoring the pressure within the tires of an automotive vehicle have been proposed. Such systems generate a pressure signal using an electromagnetic (EM) signal which is transmitted to a receiver. The pressure signal corresponds to the pressure within the tire. When the tire pressure drops below a predetermined pressure, an indicator is used to signal the vehicle operator of the low pressure.

Various tire manufacturers have suggested various locations for the pressure sensors. Known systems include coupling a pressure sensor to the valve stem of the tire. Other known systems and proposed systems locate the pressure sensors in various locations within the tire wall or tread. Tires are mounted to wheels that are commonly made from steel or aluminum.

During assembly and during routine maintenance such as tire rotation or tire replacement, the tire pressure system must be calibrated. Calibration involves associating the various tire positions with the pressure transmitters that are located on the tires. One proposed method for calibrating a system uses a magnet device to initiate the calibration. Such a device is described in PCT Publication WO 94/20317. In this system, an internal display panel with locations corresponding to the tire location is activated. When the tire locations are illuminated on the display, the vehicle operator or service technician places the magnet near the indicated tire. The transducer then sends a code corresponding thereto to the central controller. When the indicator indicates another tire location, the magnet must be brought near each tire location until each of the tire locations have a tire registered thereto. One problem with this device is that a separate component such as a magnet must be provided to the vehicle operator that is used only in the calibration process. One problem associated with a separate magnet device is that such a device is subject to loss. Thus, the tire pressure sensing system would be rendered inoperable.

Another drawback with such a system is that because many wheels are made from steel and steel is a magnetic material, the various proposed tire pressure sensing systems may not operate properly because the steel wheels may shield the magnetic energy therefrom. Therefore, the system may also be rendered inoperable because the pressure transmitter will not be activated by the magnet.

It would therefore be desirable to provide a tire pressure calibration system that overcomes the drawbacks mentioned above.

SUMMARY OF INVENTION

The present invention provides a system and method for calibrating a tire pressure monitoring system using an EM transmitter. The present invention includes a first pressure sensor coupled to a wheel of an automotive vehicle. An EM pressure transmitter is coupled to the pressure sensor. The transmitter has a serial number associated therewith. An EM calibration device has a transmitting range. The EM transmitting device has an actuator. When said actuator is activated, a calibration signal is transmitted within the transmitting range. The calibration signal causes the EM pressure transmitter to transmit a serial number. A controller is EM coupled to the pressure transmitter. The controller receives the serial number and associates the serial number with a tire location of the vehicle.

In a further aspect of the invention, a method for calibrating a tire pressure system comprises: generating an EM calibration signal from a transmitter;transmitting calibration information from a tire pressure sensor in response to said EM calibration signal; and receiving said calibration information in a controller.

One advantage of the invention is that the calibration device is preferably incorporated into a remote keyless entry device such as those that are commonly used in automotive vehicles. These devices typically transmit EM signals and therefore can be modified to transmit an additional EM signal to provide the activation signal to the pressure transmitters. This eliminates the problem in the prior art with the expense of a separate calibration tool along with the drawbacks of loss or theft of a separate evaluation tool. That is, because keyless entry devices are coupled to the key chain, they are not subject to easy loss.

Other advantages and features of the present invention will become apparent when viewed in light of the detailed description of the preferred embodiment when taken in conjunction with the attached drawings and appended claims.

DETAILED DESCRIPTION

Figure 1:
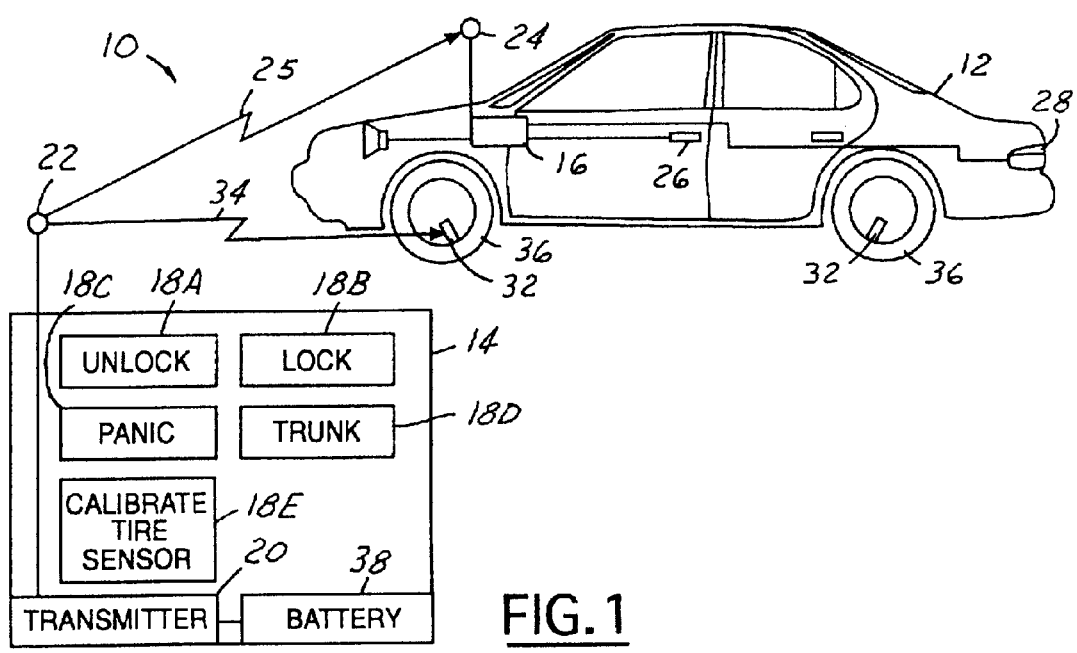
FIG. 1 is a high level diagrammatic view of a pressure monitoring system according to the present invention.

In the following figures, the same reference numerals will be used to illustrate the same components. The present invention is illustrated using a preferred arrangement in a preferred order for calibrating the system. Those skilled in the art will recognize that the various orders and components set forth herein could be changed without varying from the scope of the invention.

Referring now to FIG. 1, a pressure monitoring system 10 is illustrated relative to an automotive vehicle 12. Pressure monitoring system 10 has a transmitter 14 that is EM coupled to a controller 16. Transmitter 14 is a calibration device used in the calibration of the pressure sensors.

Transmitter 14 is preferably a hand-held transmitter such as those commonly used in keyless entry systems. Preferably, transmitter 14 incorporates the functions commonly used in keyless entry systems as well as the calibration of the pressure monitoring system according to the present invention. For example, transmitter 14 may have an unlock button 18A, a lock button 18B, a panic button 18C, a trunk open button 18D, and a calibrate tire button 18E.

Buttons 18A–18D are actuators that are commonly found on keyless entry systems of Ford Motor Company vehicles. Each button sends an unique EM signal through transmitter 20 that generates an EM signal through antenna 22. The EM signals are received by an antenna 24 which is coupled to controller 16. Automotive vehicle 12 has a lock 26 which is controlled by unlock button 18A and lock button 18B. A trunk latch 28 is controlled by trunk latch button 18D. Panic button 18C controls the operation of a horn 30 within the vehicle.

Calibrate tire button 18E also generates an EM calibration signal 34 that is directed to a tire pressure sensor 32 located in each of the tires 36 of automotive vehicle 12. Of course, other types of actuators may be used including levers, subminiature buttons, and recessed buttons. Also, the same function could be accomplished by actuating two existing buttons simultaneously to trigger the emission of the calibration signal. The EM signal generated by transmitter 20 during actuation of buttons 18A–18D has a range which is preferably around 50 feet. In contrast to that, calibrate tire sensor 18E preferably has a limited range so that only one tire pressure sensor 32 answers in response to tire calibration signal 34.

Preferably, transmitter device 14 has a battery 38 therein. Battery 38 preferably powers the device and transmitter 20. Battery 38 preferably provides a long life for uninterrupted operation of transmitter device 14.

Figure 2:
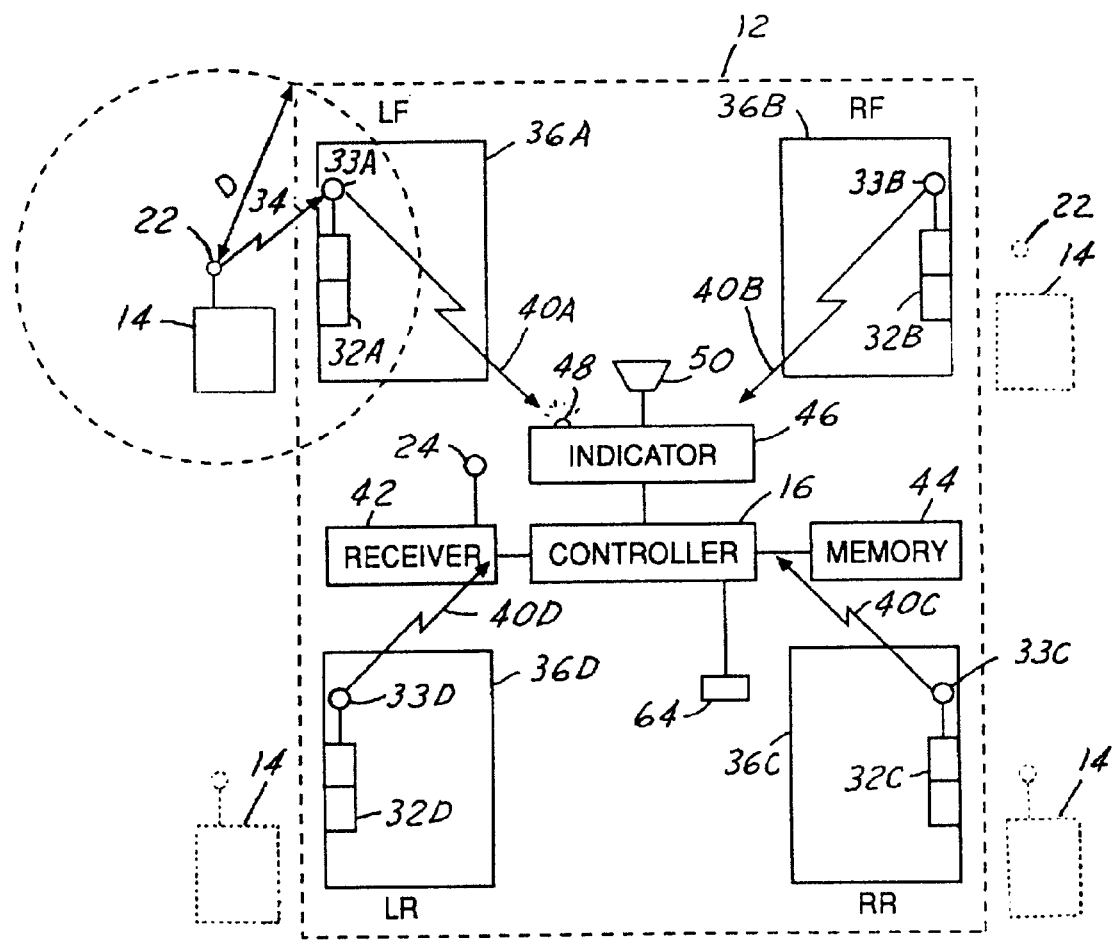
FIG. 2 is a block diagrammatic view of a pressure monitoring system according to the present invention.
Figure 2A:
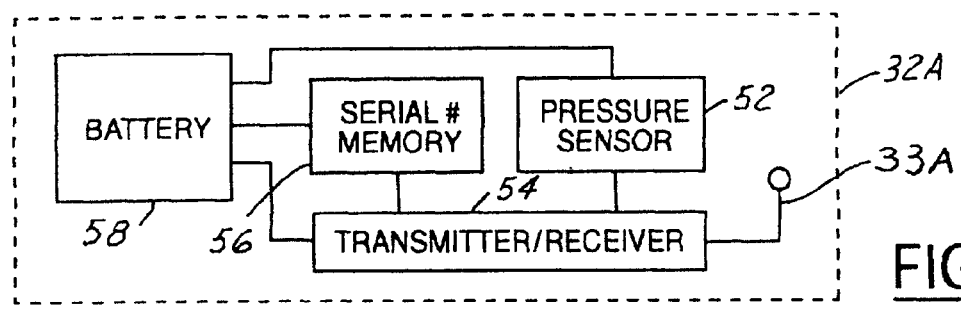
FIG. 2A is a block diagrammatic view of a pressure transmitter according to the present invention.

Referring now to FIGS. 2 and 2A, a more detailed block diagrammatic view of pressure monitoring system 10 is illustrated. The present invention may be used in an automobile type of automotive vehicle 12. The automotive vehicle 12 is illustrated with four tires 36A, 36B, 36C, and 36D. A pressure sensor transmitter 32A, 32B, 32C, and 32D are associated with a respective tire. As illustrated, tire 36A is associated with the left front position of the automotive vehicle, tire 36B is associated with the right front tire position, tire 36C is positioned in the right rear tire position, and tire 36D is positioned in the left rear tire position. The present invention also applies to other types of automotive vehicles having various numbers of wheels and tires. For example, in some pickup trucks, four rear tires may be present. In other types of cargo trucks, eighteen tires or more may be used. Other types of automotive vehicles having pneumatic wheels may also benefit by the present invention. Of course, the range of the transmitter 14 may need to be adjusted to avoid EM interference with unintended pressure sensors. Another example of an automotive vehicle is an airplane.

As mentioned above, transmitter device 14 preferably generates calibration signal 34 having a predetermined range D. The predetermined range is preferably short relative to the distance between the tire positions. For example, the range of calibration signal 34 may be less than three feet and preferably less than two feet. At maximum, the range of EM calibration signal 34 is less than half the distance between the shortest distance between the tire positions. That is, the distances between tire 36A and 36B, or 36D and 36C, or 36C and 36D, or 36D and 36A. In response to the actuation of calibration sensor button 18E shown in FIG. 1, tire pressure sensor transmitter 32A generates a calibration information signal 40A through antenna 33A to antenna 24 which is coupled to a receiver 42. Receiver 42 is coupled to controller 16 which receives the calibration information. The calibration information is stored in a memory 44 that is also coupled to controller 16. An indicator 46 is also coupled to controller 16. Indicator 46 may include an indicator light 48 which generates a visual signal or an audible device 50 such as a speaker or buzzer that generates an audible signal. Indicator 46 may provide some indication as to the operability of the system such as confirming receipt of a calibration information signal 40 or other command or controls as will be further described below. Indicator 46 and memory 44 may also be a part of the tire pressure monitoring system which is used to indicate the presence of a low tire pressure in one of the tires.

As is best shown in FIG. 2A, a typical tire pressure sensor transmitter 32A having respective antenna 33A is illustrated. Tire pressure sensor transmitter 32A has a pressure sensor 52 coupled to a transmitter/receiver 54. Other sensing devices such as temperature sensors may also be included as well as other data that may contain information about the tire and wheel construction. This may also be referred to as a transceiver. Transmitter/receiver 54 is also coupled to a serial number memory 56 and the antenna 33A. A battery, which is preferably a long life battery, is coupled to serial number memory 56, pressure sensor 52, and transmitter/receiver 54 to power the tire pressure sensor transmitter 32A. Transmitter/receiver 54 transmits the serial number located within serial number memory 56 through antenna 22 to controller 16 through receiver 42. The receiver portion of transmitter/receiver 54 recognizes the calibration signal 34 from transmitter 22. In response thereto the calibration information signal 40 is generated.

Figure 3:
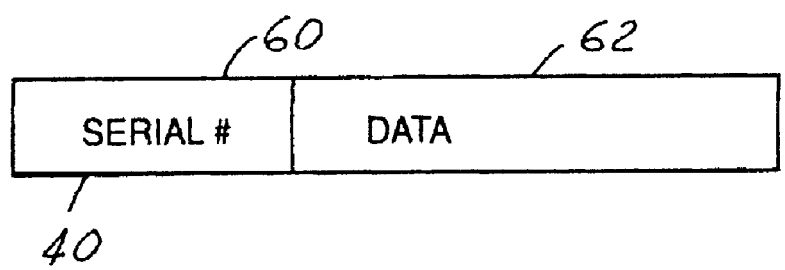
FIG. 3 is a diagrammatic view of a digital word from a pressure transmitter.

Referring now to FIG. 3, the calibration information signal 40 is illustrated. The calibration information signal may include information such as serial number 60 of the particular tire pressure sensor transmitter 32. Also, any other data associated with the calibration information may also be provided in data portion 62 immediately following the serial number 60. This information is preferably provided as a digital word. However, an analog signal may also be used.

Figure 4:
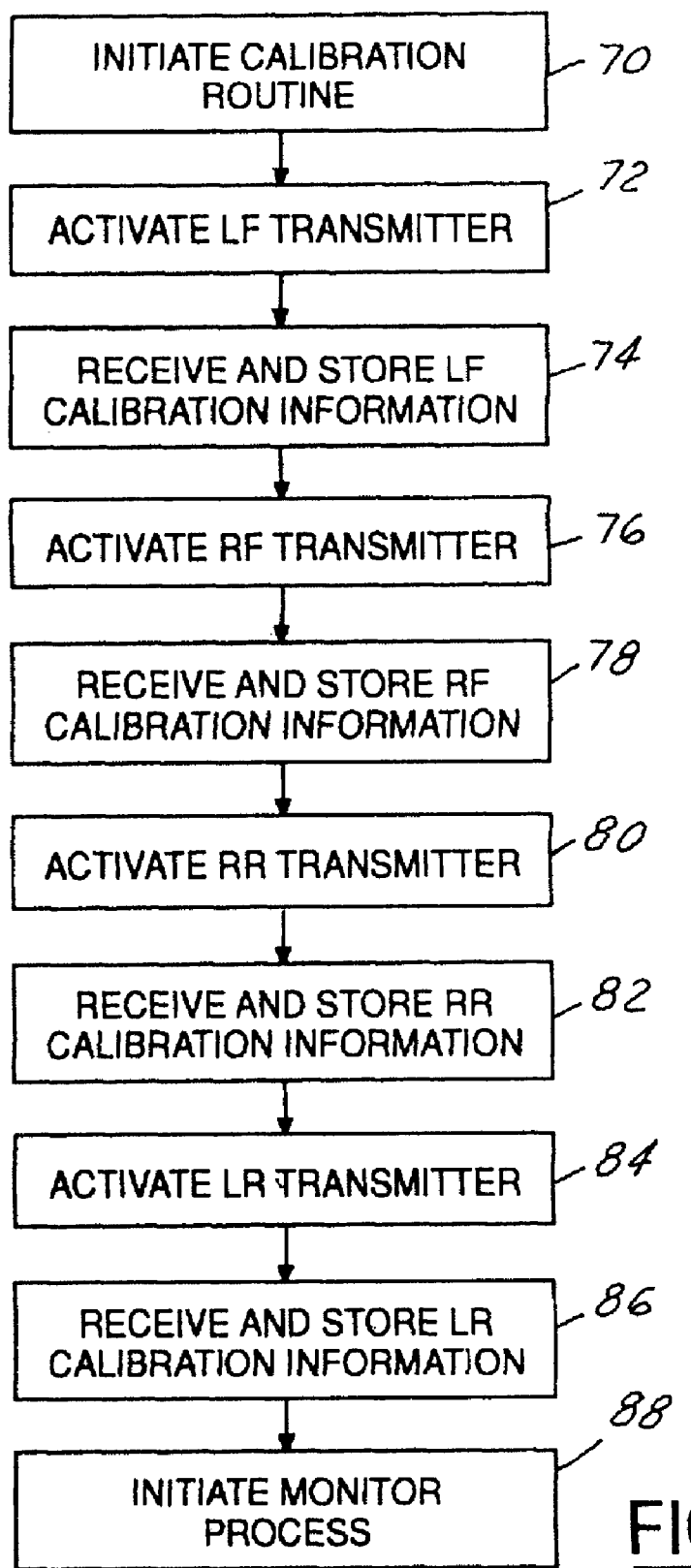
FIG. 4 is a flow chart illustrating a preferred embodiment of operation of the pressure calibration system according to the present invention.

Referring now to FIGS. 2 and 4, a method for calibrating the pressure monitoring system includes the step of initiating a calibration routine in step 70. The calibration routine may be initiated by a button 64 coupled to controller 16. Thus, upon the rotation of the tires or assembly of the vehicle, the initiation process may be initiated. Instead of providing a discrete button 64, various combinations of existing buttons may be employed in the vehicle to initiate the calibration process. Also, it is envisioned that by bringing the transmitter 14 close to a predetermined location within the vehicle, controller 16 may be set to the calibration routine. The calibration routine after initiation in step 70, the EM transmitter device 14 is activated in step 72 by depressing calibrate tire sensor button 18E near tire pressure sensor transmitter 32A. That is, calibrate tire sensor button 18E is activated so that tire pressure sensor 32 is within the range D of antenna 22. In step 74, the calibration information signal 40 is received by controller 16 through receiver 42. The location of the transmitter 32A is stored along with the serial number or other information from calibration information signal 40 into memory 44. Steps 72 and 74 are performed for the left front tire first then the right front tire, right rear tire and left rear tire are performed sequentially. To simplify the operation of the calibration system, a predetermined starting location such as the left front tire is used. The operator may be notified of this through the owner's manual or through an indicator. Also during this process, indicators may be used to signal the operator to move to the next tire or flash or provide an audio signal to confirm the successful receipt of the calibration information signal 40. The respective calibration signals may be performed in any order but are separated temporally.

In step 76, the right front transmitter is queried. That is, the transmitter device 14 is brought in close proximity to the tire pressure sensor 32B. The calibration signal or pertinent information therein is stored in memory associated with the right front tire position in step 78.

The transmitter device 14 is then moved within the range of the right rear tire pressure transmitter 32C. In step 80, the transmitter device 14 is activated. The calibration information signal 40C is thus received at the controller 16 and stored in the associated memory 44 for the right rear tire position.

The transmitter device 14 is then placed within the range of left rear tire pressure sensor transmitter 32D. The transmitter device is actuated by the calibrate tire button 18E wherein a signal is generated therefrom. In step 86, the calibration information signal 86 is transmitted to the controller where it is stored in memory for the left rear tire location. After the calibration process is complete, the pressure monitoring process 88 is initiated. This process monitors the tire pressures by receiving tire pressure data and the serial number of each of the tire pressures at predetermined times. The controller knows the location of each serial number as determined in the calibration process so that upon the detection of a low tire pressure, the vehicle operator may be warned.

It should be noted that more than four vehicle tires may be included in the process. For example, a spare tire may also be programmed in a similar manner. Likewise, various light duty and tractor trailers may also utilize the present invention. Tractor trailers may have up to eighteen or more wheels that can be calibrated in a similar manner.

While particular embodiments of the invention have been shown and described, numerous variations and alternate embodiments will occur to those skilled in the art. Accordingly, it is intended that the invention be limited only in terms of the appended claims.

What is claimed is:

1. A pressure monitoring system for a tire of an automotive vehicle comprising:
    a first pressure sensor coupled to said wheel;
    an EM pressure transmitter coupled to said pressure sensor, said transmitter having calibration information associated therewith;
    an EM calibration device having a transmitting range, said EM calibration device having an actuator therein, said actuator when actuated generating an EM calibration signal within said transmitting range;
    wherein said calibration signal causing said EM pressure transmitter to EM transmit said calibration information,
    a controller EM coupled to said pressure transmitter, said controller receiving said calibration information and associating said calibration information with a tire location relative to said vehicle.

2. A system as recited in claim 1 wherein said transmitting range is less than three feet.

3. A system as recited in claim 1 wherein said EM calibration device is hand-held.

4. A system as recited in claim 1 wherein said EM calibration device is incorporated into a remote keyless entry device.

5. A system as recited in claim 1 further comprising a receiver coupled to said controller for receiving said calibration signal.

6. A system as recited in claim 1 further comprising a memory, said controller storing said calibration information in said memory.

7. A system as recited in claim 1 further comprising an EM pressure receiver for receiving said calibration signal.

* * * * *